No. 661,881. Patented Nov. 13, 1900.
C. W. G. LITTLE.
ELECTRIC METER.
(Application filed Sept. 4, 1900.)
(No Model.) 2 Sheets—Sheet 1.
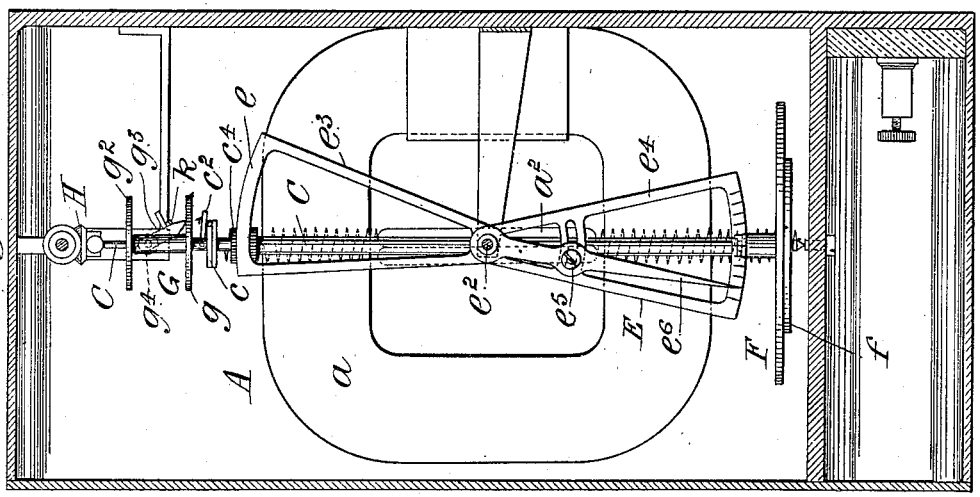
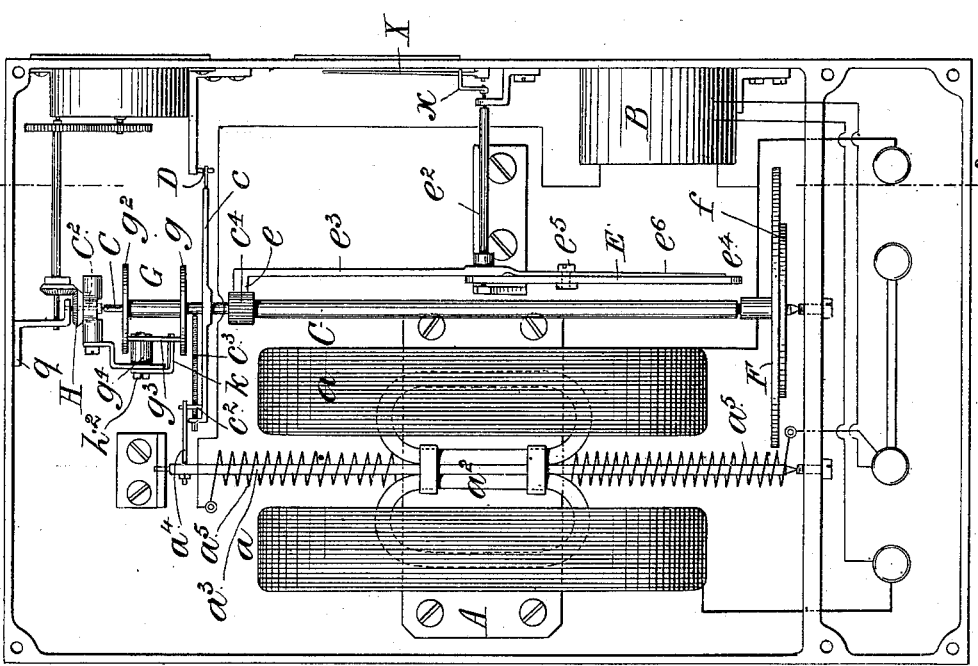
WITNESSES
Walter Abbr
M. H. Miles
INVENTOR
Charles William Godson Little
BY Hawson & Hawson
ATTORNEYS No. 661,881. Patented Nov. 13, 1900.
C. W. G. LITTLE.
ELECTRIC METER.
(Application filed Sept. 4, 1900.)
(No Model.) 2 Sheets—Sheet 2.
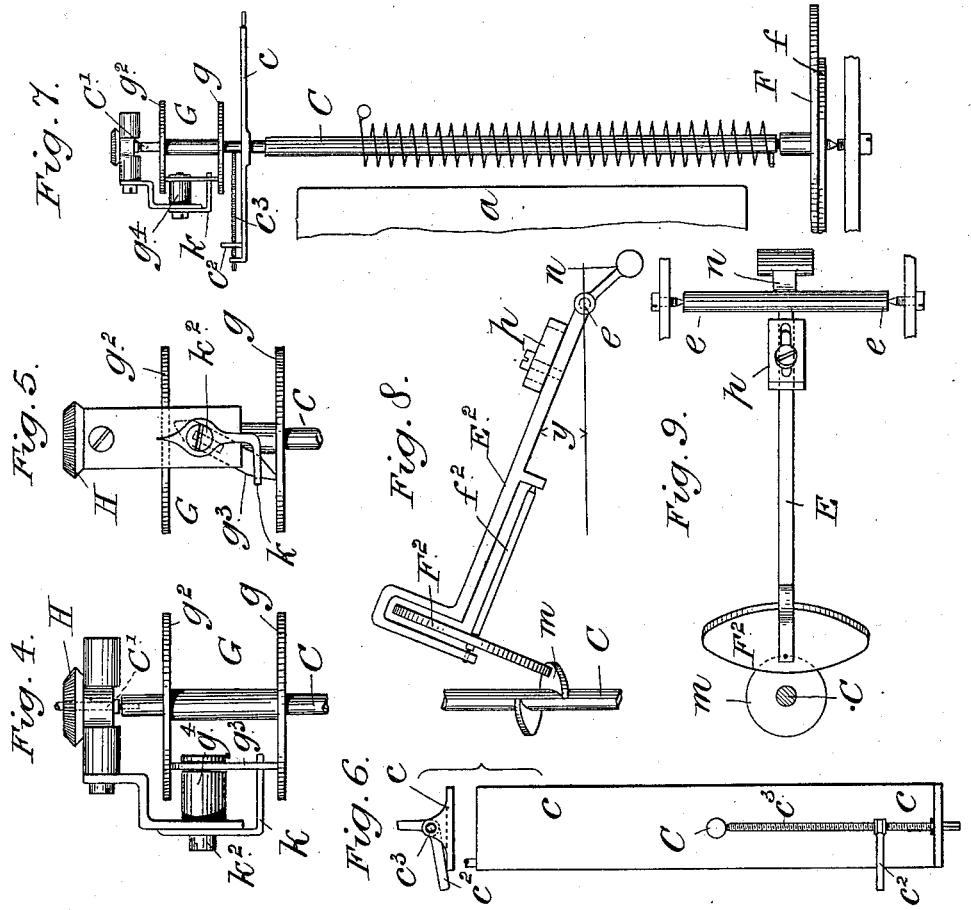
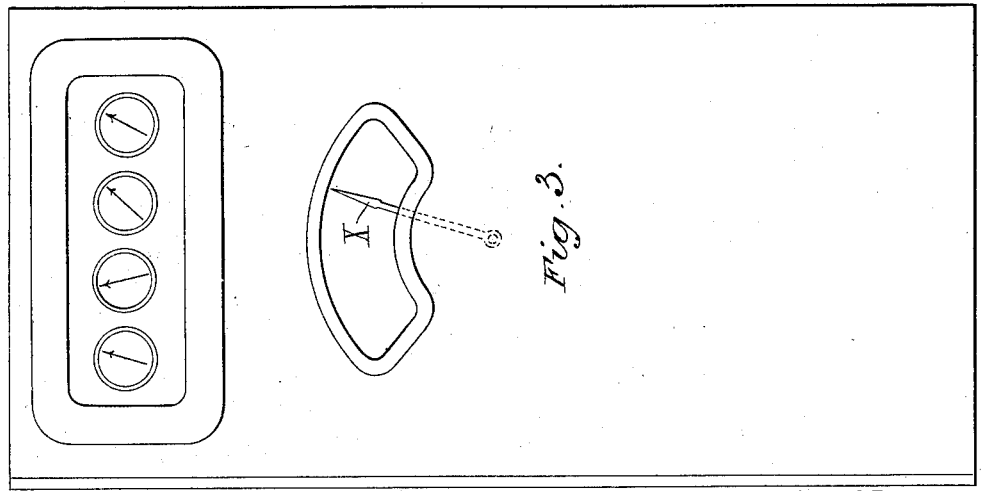
WITNESSES
Walter Abb
M. H. Miles
INVENTOR
Charles William Godson Little
BY Hawson & Hawson
ATTORNEYS

UNITED STATES PATENT OFFICE.

CHARLES WILLIAM GODSON LITTLE, OF HECKINGTON, ENGLAND.

ELECTRIC METER.

SPECIFICATION forming part of Letters Patent No. 661,881, dated November 13, 1900.

Application filed September 4, 1900. Serial No. 28,952. (No model.)

*To all whom it may concern:*

Be it known that I, CHARLES WILLIAM GODSON LITTLE, a subject of the Queen of Great Britain and Ireland, and a resident of Heckington, in the county of Lincoln, England, have invented certain new and useful Improvements in Electricity-Meters, (for which I have applied for a British patent, No. 3,031, dated February 15, 1900,) which invention is fully set forth in the following specification.

My invention relates to electrical meters used for recording and indicating the quantity of electrical energy consumed in electrical circuits; and my said invention has for its object the production of a meter in which no so-called "permanent" magnet or other magnet is employed for the dissipation of energy at a time when the accuracy of the meter can be affected by any variations in the strength of the magnet, thereby avoiding the errors which are incidental to the use of magnets, due to such variation of strength.

In electricity-meters of the type to which my invention relates there is usually a mechanism the function of which is to absorb and dissipate the energy given out by that part of the meter which is acted upon by the current to be measured. Instead of dissipating this energy at a time when the strength of magnetism can affect the accuracy of the indication or record I cause the dissipation to take place at a time when the wattmeter is not making its movement for indicating or recording. I can employ the effect of friction to produce the dissipation of the energy, as the variations in the force of friction do not affect the accuracy of the indication or record.

According to my invention I store up by means of gravity or the winding up or deflection of a spring of uniform or constant reactive effort the energy given out by the moving part of a wattmeter, and I dissipate this energy during the time that the movable part of the wattmeter is idle or not acting upon the indicating or recording mechanism. I may accomplish this, for example, by employing, in combination with the movable coil of a wattmeter, a pivoted shaft or spindle in proximity to the movable coil, the rotation of which shaft or spindle is controlled by means of gravity or of a spring. The said movable coil is provided with an arm which acts upon a corresponding arm attached to the said shaft or spindle and so arranged that for all movements of the coil beyond a certain minimum movement the angle of contact between these two arms is constant, which may be effected in any suitable way—for example, by causing the arm provided in connection with the movable coil of the wattmeter to disengage from the arm attached to the said shaft or spindle after the said coil has moved through a certain angle, but allowing the said shaft or spindle to continue its movement of rotation. By this means a constant fraction of the energy electrically given to the moving coil of the wattmeter is mechanically transmitted to the shaft or spindle, which on receiving such energy has movement of rotation given to it, and in so moving raises a weight or coils up or deflects a spring of uniform or constant reactive effort. The angular movement of the shaft or spindle is proportional to the energy given to it by the moving coil of the wattmeter, which energy is in turn proportional to the electrical energy to be measured. After the shaft or spindle comes to rest it, under the reaction of the weight or of the spring, has movement of rotation in the opposite direction, the weight or the spring returning to its normal position, and it is during this return stroke that the dissipation of the energy stored up during the forward motion takes place, which dissipation can be effected by friction or magnetism, or both combined. If by magnetism, the shaft or spindle may be provided with a metal disk actuated by a pawl or other device, causing the said disk to have movement of rotation only when the shaft or spindle is making its return movement, the disk passing between the poles of a magnet in the usual way. If friction be employed to effect the dissipation, this can be conveniently effected by means of a disk fitted loosely on the shaft or spindle, so that at the termination of the return stroke of the shaft or spindle when it is arrested by a stop the disk continues to have movement of rotation and the friction thereby produced dissipates the energy stored up in the motion, while shock and rebound are prevented.

I generally prefer to arrange the apparatus so that the shaft or spindle does not make a complete rotation; but if it be arranged so as to make more than a rotation the stop can be controlled by some suitable moving part—such as the spindle or the weight, for example—so that it is protruded at the proper time. The angular motion of the shaft or spindle in one direction acts by means of pawls or the like and suitable gearing upon an indicating or recording device, which may be an ordinary counter. If the indication or record be taken during the back stroke, the friction of the counting mechanism will have no effect upon the accuracy of the meter.

The action of the movable coil of the wattmeter is controlled by means of clockwork, which is preferably electrically self-winding and which at fixed intervals electrically connects the said movable coil to a shunt from the circuit the current of which is to be indicated or recorded. This may be done in the usual way.

Any suitable reciprocating part of the instrument may act upon a pointer or its equivalent so as to carry it around or displace it, and by its being left in the extreme position to which it has been carried around or displaced it will indicate the maximum movement of the shaft or spindle, and consequently the maximum demand on the circuit, and this attachment will also serve for calibrating or verifying the accuracy of the instrument, as after being reset it will indicate the amount of energy measured by the instrument during one reciprocation of the shaft or spindle.

In order that my invention may be well understood, I will describe, with reference to the accompanying drawings, the manner in which it may be carried into practical effect.

Figure 1 is an elevation, and Fig. 2 is a section on the line 1 2, Fig. 1, of a meter constructed in accordance with my invention. Fig. 3 is a view of the outside of the apparatus at right angles to Fig. 1. Figs. 4 and 5 show in views at right angles to each other a detail, drawn to a larger scale, of the strut or pawl arrangement for actuating the indicator or recorder. Fig. 6 shows in end view and plan an enlarged detail of the arm and catch on the shaft or spindle, as hereinafter described. Fig. 7 represents a detail showing an arrangement of a spring which can be used in place of a weight for controlling the shaft or spindle and giving the return movement thereto. Figs. 8 and 9 are an elevation and plan of a further modification, as hereinafter described.

A represents a wattmeter the fixed coils $a$ of which are in the circuit of the current to be measured and the inner movable coils $a^2$ of which are in a shunt therefrom. The coils $a^2$ are secured to a spindle $a^3$, from which projects an arm $a^4$. The said spindle $a^3$ is mounted in pivotal bearings, so that it oscillates with the coils $a^2$.

B is the casing containing the clockwork, which, as usual, completes the circuit through the coils $a^2$ at intervals, so as to cause the said coils and their spindle $a^3$ to have movement of rotation in one direction, their return movement when the clockwork breaks the circuit therethrough being effected by the springs $a^5$, which also serve to convey current to and from the coils $a^2$. In proximity to the spindle $a^3$ is mounted a shaft or spindle C in pivotal bearings, in which it can oscillate easily. Secured to the upper end of this shaft or spindle C is an arm $c$, (shown in detail in Fig. 6,) which carries a counterweighted catch $c^2$, carried by a pin $c^3$. The said catch is preferably provided with a screw-nut, and the pin $c^3$ is screwed, so that the instrument can be adjusted by moving the catch along the pin. The arm $a^4$ acts on this catch $c^2$ during a portion of the angular movement of the said arm, which movement is constant for all currents exceeding a given minimum, the engagement of the said catch and arm being released at the same point at each movement of rotation in the forward direction. The counterweighting of the catch is to bring it back to position after it has yielded when the arm $a^4$ comes in contact with it on the return movement of the coils $a^2$. During the movement of the shaft or spindle C under the action of the arm $a^4$ a toothed wheel $c^4$ acts upon a rack $e$ on a weight E, secured to a spindle $e^2$, mounted in bearings, as shown, the said weight being thus raised. This spindle $e^2$ may carry an arm $x$, which acts upon a pointer X, which will be left on the extreme position to which it has been moved, and thus indicates the maximum current which has been used. After the energy given out by the wattmeter has been thus absorbed the weight descends and the rack $e$ acts upon the wheel $c^4$ and gives movement to the shaft or spindle C in the reverse direction until the arm $c$ on the said shaft or spindle C comes to rest against the stop D. On the shaft or spindle C is mounted loosely a disk F, which bears upon a disk $f$, secured to the said shaft or spindle C, and at the termination of the return stroke of the said shaft or spindle, when it is arrested by its arm $c$ coming against the stop D, the disk F continues to have movement of rotation, and the friction between it and the disk $f$ dissipates the remaining energy stored up in the motion without shock or rebound.

The movement of the shaft or spindle C is conveyed to the indicator or recorder by the following arrangement: On the shaft or spindle C is fixed a bobbin G, with flanges $g$ $g^2$. The first motion-wheel H of the indicator or recorder is secured to a bracket capable of turning loosely on the spindle $C^2$, which is secured in a bracket $q$, the lower end of the spindle $C^2$ forming the upper bearing of the shaft or spindle C. The said bracket extends down to opposite the space between the flanges of the bobbin G, where it carries a strut or pawl $g^3$, mounted upon a pin $g^4$, which passes through a longitudinal slot in the said strut or pawl, which is arrested at the proper time by a stop $k$, which can be adjusted and fixed in position by the screw $k^2$. When the shaft or spindle C has movement given to it by the moving coils of the wattmeter, the said strut or pawl runs free over the bottom flange $g$ of the bobbin G; but when the shaft or spindle C moves back again the said strut or pawl is moved so that it binds or acts as a strut between the flanges of the pulley G, and so the strut or pawl is carried around and operates the indicator or recorder. The object of the longitudinal slot in the said strut or pawl is that there shall be a little idle movement before the strut or pawl comes against the upper flange $g^2$ and is confined between the flanges, and it is by varying the amount of this idle motion by adjusting the stop $k$ that an important and special calibration of the instrument for light loads can be effected.

The weight E is preferably made in two parts capable of relative adjustment, as follows, so as to give a perfectly-correct controlling force for the shaft or spindle C: The weight is made of two sectors $e^3$ and $e^4$, which can be clamped together by the screw $e^5$, one sector preferably carrying a pointer $e^6$ and the other a scale. One of the sectors is secured to the spindle $e^2$ and the other is loose thereon, and the sectors are so adjusted that when the pointer is in its central or zero position the sectors and spindle are in equilibrium. The desired amount of controlling force can be obtained by displacing the one sector relatively to the other and will be constant for all angular movements of the spindle $e^2$ up to about thirty degrees, which is sufficient for the purpose in the instrument illustrated.

In place of using a weight a spring can be used—for example, a coiled spring—around the shaft or spindle C, secured at one end thereto and at the other end to some fixed point, as shown in Fig. 7, and by employing a large number of convolutions of wire of round or ribbon section and by giving several initial turns thereto a sufficiently constant controlling force can be obtained.

Figs. 7 and 8 show a modification of the weight by which a constant controlling force is obtained. The shaft or spindle C has a helical piece $m$ upon it. The frame $E^2$ is pivoted at $e$ and carries a wheel $F^2$ on an axis $f^2$, free to rotate in bearings, as shown. $n$ is a counterpoise placed at such an angle as to counteract the variation in the turning moment of the shaft or spindle C by change in the angle $y$, and the turning movement caused by the weight of the wheel upon the helical piece on the shaft or spindle C therefore remains constant. $p$ is a weight which can be moved and fixed on the frame to adjust the turning movement on the shaft or spindle necessary for the calibration of the meter.

If desired, the wheel can be arranged to bear on the under side of a helix, its frame being suitably counterweighted to give the necessary turning moment to the shaft.

There may be combined with the instrument a counter which will be actuated by the moving coil of the wattmeter or other reciprocating part of the instrument to show the number of times that part has reciprocated.

Having now particularly described and ascertained the nature of this invention and in what manner the same is to be performed, I declare that what I claim is—

1. In electricity-meters, the combination with the movable coil of a wattmeter, and clockwork for putting it, at intervals, in connection with the circuit the electric energy in which is to be measured, and an indicating, or recording, device; of a weight, or spring, means whereby the latter is acted upon by the said coil, and means for dissipating, during the time the wattmeter is idle, or not acting upon the indicating, or recording, mechanism, the energy stored up by such action, substantially as hereinbefore described.

2. In electricity-meters the combination with the movable coil of a wattmeter, and clockwork for putting it, at intervals, in connection with the circuit the electric energy in which is to be measured, and an indicating, or recording, device; of a shaft, or spindle, and means whereby it is acted upon by the movable coil during a constant portion of the angular movement of the said coil, and a weight, or spring, acted upon by the said shaft, or spindle, and means for dissipating energy during the return motion of the said weight, or spring; substantially as hereinbefore described.

3. In electricity-meters the combination with the movable coil of a wattmeter, and clockwork for putting it at intervals in connection with the circuit the electric energy in which is to be measured, and an indicating, or recording device; of a shaft, or spindle, and means whereby it is acted upon by the movable coil, and a weight, or spring, acted upon by the said shaft, or spindle; and a disk fitted loosely on the said shaft, or spindle, and so arranged that when the said shaft, or spindle, is arrested at the termination of its return stroke the said disk can continue to travel forward; and means whereby friction is applied to the said disk, substantially as hereinbefore described.

4. In electricity-meters the combination with the movable coil of a wattmeter, and clockwork for putting it at intervals in connection with the circuit the electric energy in which is to be measured, of a shaft, or spindle, and means whereby it is acted upon by the movable coil during a constant portion of the angular movement of the said coil, and a weight, or spring, acted upon by the said shaft, or spindle, and means for dissipating during the return motion of the said weight, or spring, and gearing connected with an indicating, or recording, device so arranged that the indication, or record, is made during the back stroke, substantially as hereinbefore described.

5. In electricity-meters of the kind herein referred to gear for transmitting motion to the indicator, or recorder, consisting of a bobbin, or two disks, carried on a shaft, or spindle, acted upon by the movable coil of a wattmeter, and a strut, or pawl, in connection with the indicator, or recorder, gear, and acting between the flanges of the bobbin, or the two disks, to receive movement in one direction therefrom the said strut, or pawl, having longitudinal play for the purpose explained, substantially as hereinbefore described.

6. In electricity-meters of the kind referred to, wherein a weight is raised by movement of a wattmeter-coil, the construction of the weight from two sectors capable of relative adjustment, and provided with means for fixing them in their adjusted position; substantially as and for the purpose hereinbefore described.

7. In an electricity-meter of the kind referred to, the combination with the movable coil of a wattmeter and a shaft or spindle through which its movement is transmitted to a recorder, or indicator; of an arm in connection with the movable coil and a catch carried by an arm on the said shaft, or spindle, and means for adjusting the said catch; substantially as, and for the purpose, hereinbefore described.

In testimony whereof I have signed this specification in the presence of two subscribing witnesses.

CHARLES WILLIAM GODSON LITTLE.

Witnesses:
 WILLIAM JOHN WEEKS,
 RICHARD BUNDY.